United States Patent
Boitsov et al.

(10) Patent No.: US 7,278,585 B2
(45) Date of Patent: *Oct. 9, 2007

(54) REDUNDANT TWO-DIMENSIONAL CODE AND A DECODING METHOD

(75) Inventors: Sergej Valentinovitch Boitsov, Sankt-Petersburg (RU); Vjatcheslav Aleksejevitch Kolesnik, Sankt-Petersburg (RU); Joachim Ihlefeld, Dresden (DE)

(73) Assignee: Baumer Optronic GmbH, Radeberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/368,652

(22) Filed: Mar. 5, 2006

(65) Prior Publication Data

US 2006/0226244 A1    Oct. 12, 2006

Related U.S. Application Data

(62) Division of application No. 10/357,094, filed on Feb. 3, 2003, now Pat. No. 7,066,395.

(30) Foreign Application Priority Data

Feb. 4, 2002    (EP) .................... 0200254

(51) Int. Cl.
*G06K 19/06*    (2006.01)
(52) U.S. Cl. .................... 235/494; 235/456; 235/487; 235/462.09
(58) Field of Classification Search ................ 235/456, 235/462.09, 487, 462.08, 462.1
See application file for complete search history.

(56) References Cited

U.S. PATENT DOCUMENTS 6,296,192 B1 * 10/2001 Hecht .......................... 235/494
6,330,976 B1 * 12/2001 Dymetman et al. ......... 235/487
6,418,244 B2 * 7/2002 Zhou et al. ................. 382/306

* cited by examiner

*Primary Examiner*—Seung Ho Lee (57) ABSTRACT

In order to reduce a two-dimensional data structure to a minimum number of bits, a two-dimensional surface pattern is provided, which can be used in particular for identifying an absolute position on the surface and which has a pattern which comprises a SYNC pattern, which is used for synchronization, and a position-dependent code PC(x, y), with the SYNC pattern being variable and being formed in accordance with an already known formation rule.

47 Claims, 8 Drawing Sheets

| 1 | 1 | 0 | 0 | 1 | 0 | 1 | 1 | 0 |
|---|---|---|---|---|---|---|---|---|
| 0 | 1 | 0 | 1 | 1 | 1 | 1 | 1 | 0 |
| 1 | 1 | 0 | 1 | 0 | 1 | 1 | 1 | 0 |
| 1 | 0 | 1 | 0 | 0 | 1 | 1 | 0 | 1 |
| 0 | 0 | 0 | 1 | 1 | 0 | 1 | 0 | 0 |
| 0 | 0 | 1 | 1 | 1 | 1 | 0 | 0 | 1 |
| 1 | 0 | 0 | 0 | 0 | 1 | 1 | 0 | 0 |
| 0 | 1 | 0 | 1 | 0 | 0 | 1 | 1 | 0 |
| 0 | 1 | 0 | 1 | 0 | 1 | 1 | 1 | 0 |

|  | 1V |  | 1V |  | 1V |  |
|---|---|---|---|---|---|---|
| 0H |  | 1H |  | 1H |  |  |
|  |  |  |  |  |  |  |
|  | 0V |  | 0V |  | 0V |  |
| 0H |  | 1H |  | 1H |  |  |
|  |  |  |  |  |  |  |
|  | 0V |  | 0V |  | 0V |  |
| 0H |  | 1H |  | 1H |  |  |

REDUNDANT TWO-DIMENSIONAL CODE AND A DECODING METHOD

CROSS-REFERENCES TO RELATED APPLICATIONS

This is a Divisional Application of U.S. patent application Ser. No. 10/357,094 now U.S. Pat. No. 7,066,395, which was filed on Feb. 3, 2003 and claimed priority of European Patent Application 02 002 542.5, filed on Feb. 4, 2002.

STATEMENT REGARDING FEDERALLY SPONSORED RESEARCH OR DEVELOPMENT

Not applicable.

BACKGROUND OF THE INVENTION

The invention relates to a redundant, two-dimensional code and to a decoding method, which is adapted for code evaluation, in particular to a code for determining a two-dimensional position of a reading appliance, which is adapted for code evaluation, on a surface.

TECHNICAL FIELD

The electronic determination of the position of an input appliance for storage, processing or indication of handwritten information generally requires an active input surface. The dimensions of an input appliance such as this therefore rapidly become inconvenient. Furthermore, the area of the input field is restricted by the active surface area, or base. In addition, the handwritten original is required for many applications in addition to electronic detection and recording, although this is lost if the input is made via an electronically active base.

On the other hand, data can be read from a passive base or surface by means of barcodes. However, by their nature, barcodes such as these are one-dimensional and can accordingly not be used for two-dimensional position detection.

In order to achieve a higher information density than that with barcodes, two-dimensional codes or matrix codes have been developed for this purpose. Codes such as these may be used for determining positions, provided that they are on a passive base, such as a sheet of paper. However, two-dimensional codes such as these are subject to the difficulty of determining the start of a data field that is to be read. In order to make it possible to decode the coded data it is necessary to scan or sample a relatively large data field for this purpose, in which a number of identification structures that are to be identified are generally located. Identification structures such as these must allow the determination of the angular orientation of the data structure on the one hand, as well as the association of the data structures and the orientation of the data structures on the other hand. In order to make it possible to ensure both, a field of view for the recording of the data has until now been required which is at least twice as large as the individual data units. If, by way of example, the structures for determining the angular orientation of the input appliance relative to the surface are located at the edge of a data unit, then the orientation structures are not always all in the field of view if the diameter of the field of view is less than twice the length of the diagonals of the data units, so that it is not possible to determine the orientation. Until now, the physical association of the data structures has been accomplished by means of so-called homing structures in the surface pattern, by means of which the data can be associated with a data block, in the form of surface structures.

In addition to detecting position data of a writing tip, there are also other applications for two-dimensional codes, such as rapid and high-precision two-dimensional position identification for optical test equipment. Such test equipment may be used, inter alia, for identifying the position and positioning of tools.

One known two-dimensional information coding is the Bresenham coding. In this case, dots are in each case shifted by ⅓ of the grid period, upward, downward to the left or to the right relative to an orthogonal grid. Each grid point thus has a "weight" of two bits, with the codes then being decoded separately in the x and y directions. Sub-elements of a code are obtained in each row and column, and the code is then assembled from a number of rows and columns. If the required resolution is, for example, 100 μm, which corresponds to the smallest dot separation, the information density is 2 bits/(300×300 μm$^2$). A code unit must be detected completely for decoding, and this condition is satisfied whenever the detected field of view of the corresponding data recording unit is at least twice as large as the code unit. If an information unit or code unit has a size of seven grid points, this requires a code unit size of approximately 2×2 mm$^2$ and hence a square field of view of approximately 4×4 mm$^2$, with the resolution as assumed above.

If structures such as these are used for determining positions on a passive writing base, then the requirement for a field of view, which is large in comparison to the data structures decreases the achievable position-determination accuracy.

Furthermore, the identification of structures within a large field of view demands low-distortion optics with a wide depth of focus and little aberration, which is difficult to achieve for optical systems which are located close to the object to be recorded.

The finite depth of focus of the optics is particularly problematic during operation close to the diffraction boundary, when pixels in the order of magnitude of less than 2 μm are used. The position of the pen tip must be calculated indirectly from the position of the intersection of the optical axis of the camera with the paper and the parallax (falling grid lines).

Since the optics are generally not accommodated in the tip of the reading/input appliance that is used for writing, parallax also occurs between the position of the writing tip and the data structure that is detected by the optics, and this parallax is also dependent on the inclination (which is dependent on the handling by the user) of the read/input appliance with respect to the surface of the writing base, and hence changes continuously. This also considerably decreases the accuracy with which the position is determined.

A further disadvantage of information codings is that the information, which is produced by the reading optics can be only partially evaluated. Recording optics of a reading appliance generally produce a circular field of view. However, the code units are mostly square. The information that is located outside such a code unit but within the field of view cannot be used for decoding on the basis of the known methods, so that it is not possible to use all of the available information. The known coding/decoding methods thus cannot be used for any desired geometric arrangement of the data that is being read.

SUMMARY OF THE INVENTION

The invention is thus based on the object of providing an optimum code with a high information density, and a decoding method which is matched to this code and which can also be read in a stable manner with a small field of view on any desired shape.

This object is achieved in an extremely surprising manner by means of a surface pattern having the following features: a two-dimensional surface pattern, in particular for identifying an absolute position on the surface, comprising a pattern with the pattern containing a SYNC pattern, which is used for synchronization, and a position-dependent code PC (x, y), wherein the SYNC pattern is variable and is formed in accordance with an already known formation rule.

The object is also achieved by a method for decoding data in an area of a surface pattern with the surface pattern containing a variable SYNC pattern, which is used for synchronization and is formed in accordance with an already known formation rule, as well as a position-dependent code PC (x, y) wherein a complete position-dependent code which is associated with one position on the surface pattern can always be decoded from the area of the surface pattern, in that parts of adjacent position-dependent codes which are located in that area of the surface pattern are used to supplement missing parts of the position-dependent code for decoding, and also a method wherein the result of the decoding process for each code unit leads to a number of vectors vij of the type: the position-dependent code PC (x, y), document identifier, time stamp, error number, position of the pen tip, with the time stamp describing the time at which a code unit was detected, the error number describing the number of errors during detection of the code, and the position of the pen tip describing the point of a writing appliance on the surface.

The object of the invention is also achieved by a method for determining the position (Ps) of a tip of a writing appliance with an optical image recording device on a surface, in particular for a method for decoding data which is contained in a surface pattern wherein the grid on which the pattern is based is compared with the image recorded by the writing appliance and any parallax distortion is determined, wherein the angle of tilt of a defined axis of the writing appliance relative to the surface is calculated from the parallax distortion, and a displacement vector relative to an axis of the image recording device is calculated from the tilt.

A two-dimensional surface pattern which can be used in particular for identifying an absolute position on the surface and has a pattern which comprises a SYNC pattern, which is used for synchronization, and a position-dependent code PC(x, y) allows a two-dimensional data structure to be reduced to a minimum extent, or to a minimum number of bits, if the SYNC pattern is variable and is formed in accordance with an already known formation rule. There is no need for any orientation pattern or a "homing structure" for the code according to the invention. In this context, a surface pattern is a pattern which should be visible from at least one side in the vicinity of the surface, with the visibility in this context not being restricted to the human visual spectrum, but also being able to include the UV and IR spectra. A variable SYNC pattern is a pattern which is used for synchronization and which may vary across the surface. This is achieved by the SYNC pattern having additional structuring or modulation, whose formation rule is known, along one or more directions on the surface.

The surface pattern is the physical embodiment of an information distribution. This information distribution is represented, in order to assist understanding, by a binary 2D distribution with black (0) and white (1) squares, but may be produced by a large number of other modulation methods.

In order to simplify the synchronization process, or the process of determining reference points in the surface pattern, the SYNC pattern may advantageously have two components, each of which may be used for synchronization along two directions, which are not parallel, on the surface.

In order to obtain a smaller field of view than a square whose length is virtually twice that of the code unit, the SYNC information must be distributed such that a complete SYNC pattern is also produced when, for example, four quarters of cut-off incomplete code units are located in the field of view. In this situation, the decoder must be able to obtain the missing SYNC information from the adjacent code units. It is therefore important for the SYNC information to be arranged not only in a corner but geometrically uniformly over the surface of the code unit.

In order to ensure the SYNC pattern identification stability that is required for representation of the information, ambiguities and disturbances shall be avoided as far as possible. The SYNC pattern may additionally have position-dependent code, in order to make it possible to reduce the number of bits required to represent the necessary information. Since a large SYNC pattern reduces the net number of bits per code unit, it is also possible, for example, to use the least significant bits (LSB) of the x and y coordinates for synchronization. An optimum is achieved in this case when the SYNC pattern is formed exclusively from the LSBs of the x and y coordinates. However, other information, such as the document identifier, may also be integrated in the SYNC pattern. In particular, it is particularly advantageous in this case to integrate the LSBs of the position-dependent code in the SYNC pattern. The LSBs of the x and y coordinates change alternately in a Cartesian representation of the coordinates, thus resulting in additional structuring of the SYNC pattern. This structure can be used in particular to define the azimuth orientation of the optics of the reading appliance with respect to the base. Due to the symmetry of the SYNC pattern, it is possible for the surface pattern to be superimposed on itself by rotating it through half a revolution, which means that it is impossible to distinguish between the two situations. If, on the other hand, the LSBs of the x and y coordinates are integrated in a suitable manner in the SYNC pattern, then the SYNC pattern has an additional characteristic modulation, which makes it possible to distinguish between and to identify rotations of the reading appliance with respect to the base. A SYNC pattern such as this has also been found to be highly resistant to typical disturbances in the pattern, such as black or white spots. The variability of the SYNC pattern according to this exemplary embodiment is thus produced by the characteristic modulation of the LSBs, whose formation rule is also known, since the low and high bits alternate both along the x direction and along the y direction.

The components of the surface pattern are in this case advantageously combined into units, in the form of code units, which preferably have a square or hexagonal shape. A code unit is in this case an area of the surface pattern which contains at least one data record, which contains a complete SYNC pattern, a complete position-dependent code PC(x, y) for the point at which the code unit is located, and parts of a complete document identifier DI.

In order to minimize the field of view which is required for identification of the surface pattern, it is also expedient for the SYNC pattern to be arranged on the surface with at least twice the position frequency in the x and y directions in comparison to the position-dependent code and to the document identifier DI. This ensures that sufficiently large parts of the SYNC pattern are located in the field of view for reliable identification even if the size of the field of view is equal to one code unit.

In order to improve the error tolerance for pattern identification, redundant coding of the data in the surface pattern is particularly advantageous. In particular, the position-dependent code PC(x, y) and/or the document identifier may be redundantly coded. A Hamming coding or a Reed Solomon coding, for example, is suitable for this purpose. Furthermore, a modified Hamming coding can advantageously be used for this application, and this will be described in detail further below.

Parts of the document identifier may also be coded in the SYNC pattern, as well as the position-dependent data, such as the LSBs of the data words in the x and y position.

The position-dependent code PC(x, y) of the two-dimensional surface pattern can advantageously be associated with a function which describes the neighborhood relationships to other adjacent code units. This allows the contents of the adjacent code units, and hence their pattern, to be predicted, so that a comparison with the scanned or sampled data further increases the redundancy, and hence also the sampling or scanning reliability.

In this case, it is particularly advantageous if others of the position-dependent codes PC(x, y) can be calculated from the position-dependent code PC(x, y) of a known code unit by means of the function which is associated with the position-dependent code PC(x, y).

If all the adjacent code units can be calculated from the single position-dependent code PC(x, y) in the position-dependent code PC(x, y) by means of the function which is associated with the position-dependent code PC(x, y), then the data to be expected can be extrapolated by sampling or scanning the surface. In the simplest case, the function in this case represents the Cartesian coordinates of the code units.

If the function for the association of code units is in the form of an association table, it is particularly advantageous to use visible printed colors to represent the surface pattern. This allows scrambling of the neighborhood relationships between the code units. If the sequence of the code units on the surface is scrambled in any desired direction on the surface, then it is possible to avoid cyclically occurring structures in order to prevent artefact or Moiré effects, for example when producing copies.

According to one preferred embodiment, the size of the code unit in one direction on the surface is approximately 4 mm. This value represents a good compromise between reliable reproducibility and achievable position resolution.

Furthermore, pattern modulation which can be identified by the reading appliance is required for detection of the pattern. In this case, amplitude modulation is particularly highly suitable for representing the surface pattern on a passive surface. In this case, an implementation by means of a light/dark pattern of shape elements, for example by printing with suitable colors, can be produced particularly easily for this purpose. The specific modulation, that is to say, the signal form about a support point on the grid, depends on the printing method that is used. In principle, the modulation method that is used must have an energy component that is sufficient for identification of the optimum grid.

Depending on the type of reading appliance or the programming for data evaluation, different shape elements may be advantageous for efficient identification. For example, squares, triangles, circles or dots are suitable for use as shape elements.

Apart from amplitude modulation, phase modulation PSK may also be used for modulation of the surface pattern, in which shape elements, in particular dots, are arranged shifted with respect to a reference grid.

In the same way, the two-dimensional surface pattern may, however, also be modulated using frequency modulation FSK, in which groups of shape elements are arranged at predefined 2D position frequencies on the surface, provided, by way of example, that the pattern detection and evaluation processes are optimized for accurate frequency measurements.

The pattern identification and evaluation processes can also be simplified by the pattern having more than one color, in particular more than one spectrally separable component, and by one spectrally separable component having a different modulation than another spectrally separable component.

It is also advantageous to use colors that are not visible to the human eye. The spectrally separable components may comprise the IR spectrum and, in particular, IR/fluorescence bands of colors which can be excited and which can be printed on the surface, so that the patterns cannot be perceived by the human eye but are easy to identify by adaptive infrared optics.

The surface pattern need not necessarily comprise one cohesive area. In fact, the surface pattern may also be subdivided into a number of parts. In particular, the parts may also be located separately from one another on one or more surfaces. The surface pattern can thus be applied to individual areas on a surface, or else, for example, may be located on different objects. A pattern such as this may, for example, assist the spatial orientation of automatic systems, for example robots. A container may also, for example, be provided with such a pattern at its corners, thus allowing a fully automated loading station with suitable optics to be used for detecting the pattern as spatial orientation aid. Mobile fully automatic systems can likewise determine their own position in an area which is equipped with a pattern according to the invention at specific points.

The application area of a surface pattern according to the invention is, of course, not restricted to applications for determining position. Other information may also likewise be coded in the pattern. In general, a pattern such as this may also be used for product identification and for product marking, or for similar applications in which bar codes or matrix codes are used.

The surface pattern according to the invention with a variable SYNC pattern allows reliable identification of the information contained in the pattern, with a field of view which is considerably smaller than that in the prior art.

In a corresponding manner, the scope of the invention also includes a method for decoding data in an area of a surface pattern which has a variable SYNC pattern which is formed in accordance with an already known formation rule and is used for synchronization, and contains a position-dependent code PC(x, y), with the area being sufficiently small that at most one position-dependent code which is associated with one position on the surface pattern is present completely within that area. As a rule, the field of view, or the area, may be sufficiently small that the area does not contain any complete position-dependent code. A position-dependent code which is associated with one position on the surface pattern can, however, always be decoded using the method according to the invention from the area of the surface pattern, in that parts of adjacent position-dependent codes which are located in that area of the surface pattern are used to supplement missing parts of the position-dependent code for decoding.

In particular, the decoding method can be adapted such that the area of the surface pattern has any desired shape. This means, for example, that the area no longer needs to have a square shape or a shape that is matched to the code units. In fact, all the information which is located in a generally round field of view of reading optics can be used for decoding, for example, while in the case of the decoding method according to the prior art just one area is chosen from the available field of view, in which at least one complete code unit is located.

The pattern according to the invention is preferably likewise subdivided into code units. However, the method may be adapted in an appropriate manner such that the area for decoding of a code unit need be only sufficiently large that at most one code unit is located completely within the area.

The scope of the invention also includes an identification or decoding method that is particularly suitable for decoding the data that is contained in a surface pattern according to the invention, in which case the result of the decoding process for each code unit leads to a number of vectors vij with entries which comprise the position-dependent code PC(x, y), a document identifier, a time stamp, an error number and the position of the pen tip, with time stamp describing the time at which a code unit was detected, the error number describing the number of errors during detection of the code, and the "position of the pen tip" describing the point of a writing appliance on the surface. A number of vectors vij may in this case be combined to form a script segment when a condition, in particular the condition "pen writing" is satisfied, in order to reconstruct the script as written by the user.

In order to record written scripts, the vectors vij may sensibly be composed of a time sequence, corresponding to the data which is detected by a pen by means of an optical detection device.

In order to improve the confidence in the determination of the position coordinates of the vectors vij, a script segment may be processed by a position filter, in order to filter out any impossible pen positions resulting from incorrect pattern identification. In this context, a script segment is regarded as a set of vectors which, when joined together, form at least a part of a written script. The associated vectors are in consequence also linked to one another in terms of their position and time stamp coordinates.

One suitable method of achieving this is, for example, simple filtering in such a way that when the "pen writing" condition is satisfied during the decoding process, only movements by ± one code unit are allowed in one of the directions on the surface. If, for example, a scanning or sampling rate of 300 frames per second (300 fps) and square code units with a size of 4 mm² are used, then this means that the maximum detectable speed for script identification with this position filtering is a speed of about 1.2 m/s, which is virtually impossible to exceed even with fast hand or pen movements.

However, lower scanning or sampling rates, for example at more than 100 fps or more than 200 fps, may also be worthwhile in order to reduce the requirements for data processing, so that it is possible to use lower-cost or more compact hardware components.

In addition to position filtering, the use of an error correction method is also advantageous, if the data in the surface pattern is redundantly coded. Reed Solomon or Hamming codes are particularly suitable for error correction in this case. Redundant coding, by means of which two errors per coordinate can be identified and one error per coordinate can be identified and corrected, has been found to be a good compromise between identification reliability and code length in this case.

However, even when using an error correction method, it is possible for the vectors associated with a code unit to be incorrectly identified. However, this error can itself be identified by position filtering. An incorrectly identified event such as this can advantageously be corrected, at least approximately, by using the error-free or correctable vectors. If, for example, it is found during the position filtering process that one code unit produces differences which are greater than unity, the associated vector is then excluded and its position-dependent code PC(x, y) is replaced by interpolation of its neighbors in time.

If the position filter as described above is used, in which filtering is carried out on the basis of the condition that only movements by ± one code unit in one of the directions on the surface are permitted during the decoding process, then, if one code unit is identified incorrectly, this filter detects a difference of greater than unity with respect to the code units that are adjacent in time, and the incorrectly identified position-dependent code is interpolated.

A context analysis method or post-processing method can also be used particularly advantageously for accurate reconstruction of incompletely or erroneously detected data of a coordinate. If one code unit is not identified or is identified incompletely or erroneously, then it is possible to determine the most probable code for the questionable code unit to be de-scrambled from a comparison with identified code units which are adjacent in time and/or positionally, and thus to reconstruct the exact code with a high probability. This also works when, for example, it has not been possible to determine any SYNC pattern. Even in this situation, possible SYNC pattern positions and orientations can be tested, and the most probable position and orientation with regard to the (physically and/or time) adjacent code units or descrambled vectors can be used as the basis for the de-scrambling of the rest of the information which is contained in that code unit. Various code hypotheses have been proposed for this purpose, and these are compared with the information of code units that are adjacent in time and/or spatially. In this context, adjacent does not necessarily mean the immediately adjacent code units. In fact, a number of code units may be used for testing the code hypothesis.

The data in the document identifier contained in the surface pattern is preferably extracted from different parts of an 8×8 bit surface information item that is contained in the pattern. One code unit may, for example, contain eight bits of the document identifier, although each code unit need not contain the same part of a document identifier. In fact, the information may also be distributed over a number of code units. It is worthwhile, for example, using four or more different identifiers. By way of example, the parts of the document identifier, when there are four parts, can be linked to the LSBs of the coded x and y coordinates in the code unit. The code parts can then be assembled correctly with the assistance of the respective timestamp and position code. This even allows detailed information to be accommodated in small code units that have restricted information content, by subdivision. All the codes that are scanned or sampled per page can then be assembled with the timestamp and position code.

In order to ensure reliable identification of the document identifier, a multiple identification process can also be carried out for the data in the document identifier.

For low-cost applications in the industry, the two-dimensional surface pattern may also be printed on an adhesive strip, which, for example, can be adhesively bonded to system parts. Inter alia, this allows relatively old machines, in particular those without position identification, to be retrofitted at low cost. Such low-cost position identification may be used, for example, for flexible transport systems. For machine tools or measurement microscopes, high-precision positioning can be achieved by applying the code to chromium templates and, for this purpose, the template is illuminated by light passing through it and is scanned by a camera which provides xy code with sub-pixel resolution. The code may likewise be used for 3D applications by scanning a number of code surfaces at the same time using two or more cameras.

In the case of a writing appliance that is equipped with an optical image recording device for determining the position of the writing tip on a surface, in particular for a method as described above for decoding data which is contained in a surface pattern according to the invention, the image center of the field of view which is detected by the optical image recording device generally does not coincide with the point of contact of the writing tip. In general, the writing appliance is also not held in a defined orientation with respect to the surface, but is held at different inclination angles with respect to the base, depending on the way it is held by the hand while writing. This leads to the distance between the code units as detected by the optical image-recording device and the point of contact of the writing appliance with the base varying as a function of the inclination of the writing appliance. In consequence, the shape and the absolute position of the recorded written script may differ from the written script as written on the surface with the writing tip. The distortion that results from this corrupts the script image, and is thus undesirable.

In order to avoid such distortion, the invention also provides a method for determining the position of a tip of a writing appliance with an optical image recording device on a surface, in particular for a method for decoding data which is contained in a surface pattern, in which the grid on which the surface pattern is based is compared with the image recorded by the writing appliance and any parallax distortion is determined. The parallax distortion is used to calculate the angle of tilt of a defined axis of the writing appliance relative to the surface, and the tilt is used to calculate a displacement vector relative to one axis of the image recording device.

In this case, for the method for determining the writing tip position, it is advantageous for the defined axis of the writing appliance to run through the pen tip of the writing appliance and essentially in the direction of its longest extent, since such a definition of the defined reference axis simplifies the calculation of the tilt angle. It is likewise advantageous to use the optical axis of the imaging system of the image recording device as one axis of the image recording device. The position of the pen tip can then be determined from the intersection of the optical axis of the image recording device with the surface, and addition of the displacement vector to this intersection.

BRIEF DESCRIPTION OF THE DRAWINGS

The invention will be described in more detail in the following text using preferred embodiments and with reference to the attached drawings, in which.

DETAILED DESCRIPTION OF THE INVENTION

Figure 1:
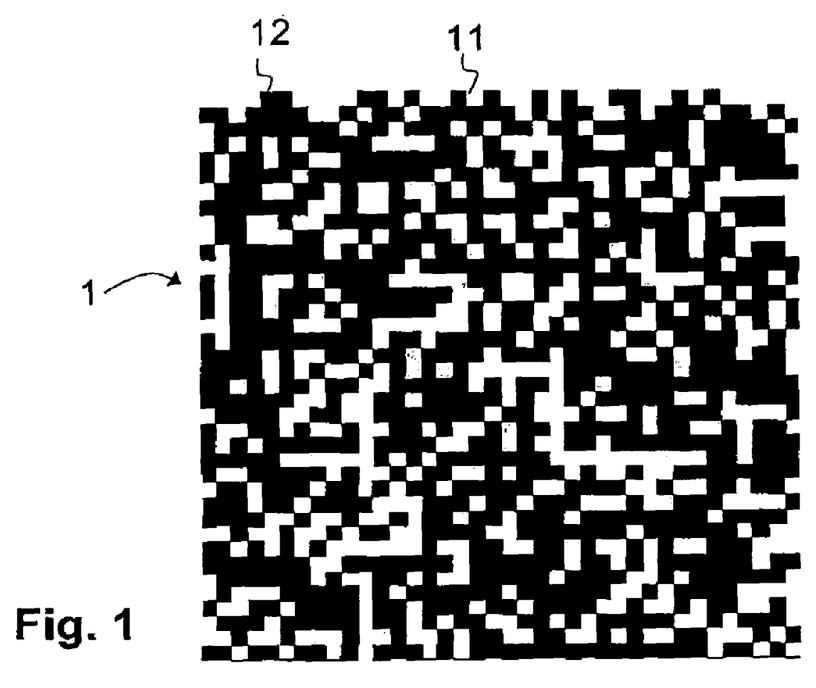
FIG. 1 shows a detail from a surface pattern according to one embodiment.

FIG. 1 shows a detail from a surface pattern 1 according to one embodiment of the invention. In this embodiment, the two-dimensional surface pattern 1 is formed by amplitude modulation in the form of a light/-dark pattern of shape elements in the form of squares 11 and 12. Light and dark squares 11 and 12 in this case represent bits whose values are zero and one. The pattern in this case does not necessarily correspond to the impression perceived by the human eye. In fact, an infrared-absorbent color could also be used for the surface pattern, so that the pattern would be imperceptible to the human eye.

The detection of position data is first of all dependent on identification of the bits represented by the light and dark squares. In a further step, the bit pattern must be subdivided into code units, in order to make it possible to associate the bits with the data vector information contained in the code units. The position of the code units in the surface pattern 1 is defined by a SYNC pattern, which is likewise contained in the surface pattern.

Since the optimum grid can be calculated considerably more accurately than the distance between the code modules (practical results give an approximation error of less than 0.1 mm for a code module size of 0.4 mm and good contrast), the position of the intersection of the optical axis with the paper is likewise determined with a resolution of better than 0.1 mm. The desired intersection is obtained with a good resolution of better than 200 dpi from the position of the plane and from the known linear equation from Mine.

Figure 2:
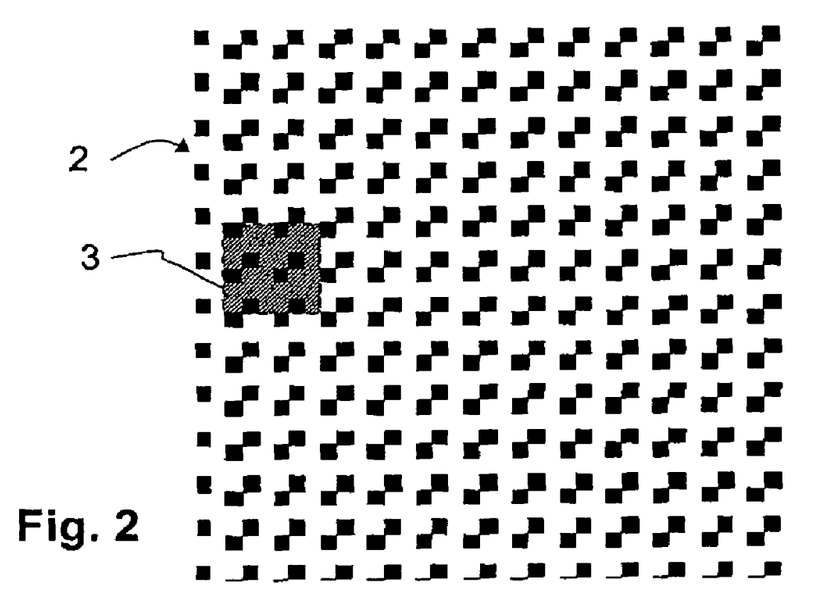
FIG. 2 shows the distribution of the SYNC pattern on which the detail shown in FIG. 1 is based.

FIG. 2 shows the SYNC pattern 2 on which the detail of the surface pattern shown in FIG. 1 is based. The squares that are illustrated dark indicate the position of the bits that are associated with the SYNC pattern. However, this does not mean that the pattern consists of dark squares or similar bits. In fact, the squares indicate only the position of the bits that are associated with the SYNC pattern. The color of the SYNC pattern, or whether it is composed of zeros or ones, is locally dependent on the information coded in the SYNC pattern, or the variation of the pattern formed in accordance with an already known formation rule.

According to one preferred embodiment, a code unit consists of a square comprising 6×6 bits. One such code unit 3 is illustrated as the shaded area in FIG. 2. The code units are immediately adjacent to one another without any space between them, so that the surface pattern is optimized with regard to two-dimensional space utilization.

Figure 3:
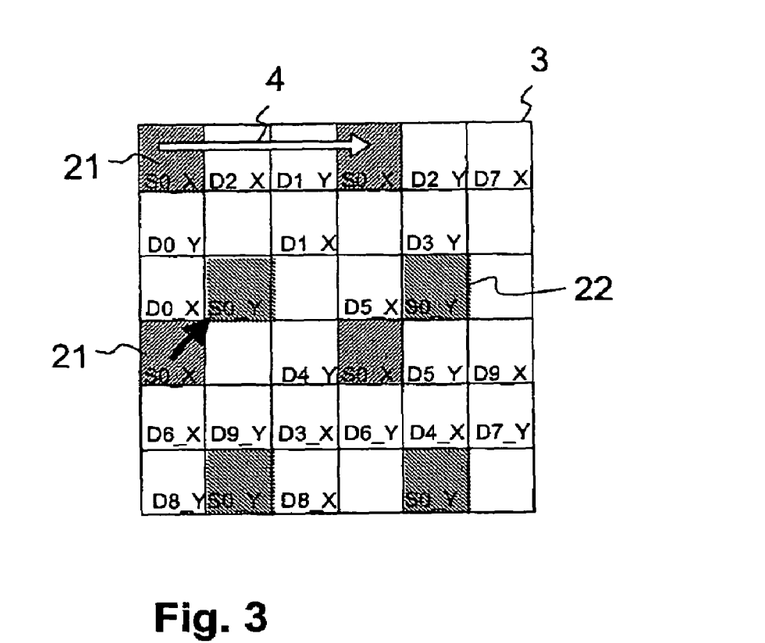
FIG. 3 shows one preferred embodiment of a code unit.

FIG. 3 shows one preferred embodiment of a 6×6 bit large code unit 3. The shaded areas 21 are bits of the synchronization pattern for horizontal synchronization (S0 X) and vertical synchronization (S0 Y). The arrow 4 indicates the direction of the horizontal. The bits of the SYNC pattern 21, S0 X, or S0 Y may in this case be the least significant bits of the data words for the X and Y positions, respectively, so that the S0 X and S0 Y bits of the SYNC pattern alternate continuously from one code unit to the next in the X and Y directions. This results in a variable SYNC pattern being produced. The X and Y positions may be coded as 11-bit data words in the code shown in FIG. 3, using LSBs as the SYNC pattern.

If, by way of example, the code unit is assumed to have an edge length of 4 mm, then there are a maximum of 75 code units in one direction if the input field is the same size as the DIN-A4 page. However, 7-bit coding would be sufficient for position determination for this purpose. The 11 bits that are available can then advantageously be used for redundant coding.

The following table lists a preferred modified Hamming coding for 7-bit position coding and three redundant bits:

| Argument (x, y) | Decimal code | Binary code | | | | | | | | | |
|---|---|---|---|---|---|---|---|---|---|---|---|
| | | D9 | D8 | D7 | D6 | D5 | D4 | D3 | D2 | D1 | D0 |
| 0 | 0 | 0 | 0 | 0 | 0 | 0 | 0 | 0 | 0 | 0 | 0 |
| 1 | 7 | 0 | 0 | 0 | 0 | 0 | 0 | 0 | 1 | 1 | 1 |
| 2 | 25 | 0 | 0 | 0 | 0 | 0 | 1 | 1 | 0 | 0 | 1 |
| 3 | 30 | 0 | 0 | 0 | 0 | 0 | 1 | 1 | 1 | 1 | 0 |
| 4 | 42 | 0 | 0 | 0 | 0 | 1 | 0 | 1 | 0 | 1 | 0 |
| 5 | 45 | 0 | 0 | 0 | 0 | 1 | 0 | 1 | 1 | 0 | 1 |
| 6 | 51 | 0 | 0 | 0 | 0 | 1 | 1 | 0 | 0 | 1 | 1 |
| 7 | 75 | 0 | 0 | 0 | 1 | 0 | 0 | 1 | 1 | 0 | 1 |
| 8 | 82 | 0 | 0 | 0 | 1 | 0 | 1 | 0 | 0 | 1 | 0 |
| 9 | 85 | 0 | 0 | 0 | 1 | 0 | 1 | 0 | 1 | 0 | 1 |
| 10 | 97 | 0 | 0 | 0 | 1 | 1 | 0 | 0 | 0 | 0 | 1 |
| ... | ... | | | | | | | | | | |
| ... | ... | | | | | | | | | | |

This modified Hamming code has a Hamming distance of 3 bits, so that two erroneous bits can be identified, and a single bit error can be corrected.

An eight-bit data word may, for example, be coded such that the LSB of the data word is used as the SYNC pattern, and the remaining seven bits are coded redundantly in accordance with the scheme shown in the table.

Figure 4:
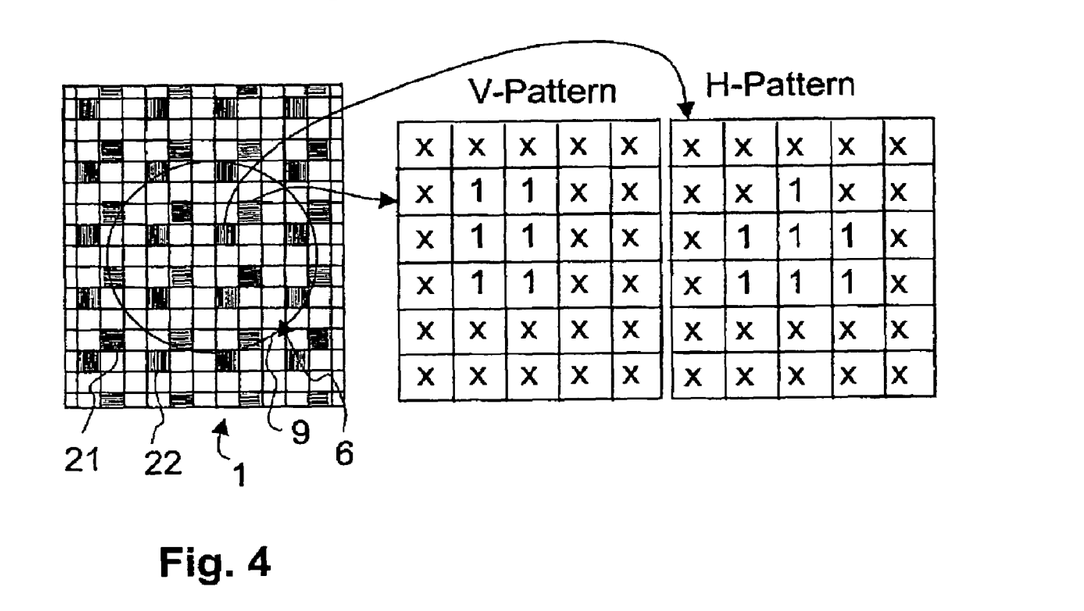
FIG. 4 shows an illustration of the principle of the SYNC pattern identification with horizontal and vertical components.

FIG. 4 shows the principle of pattern identification of the SYNC pattern 2. In one preferred embodiment of the surface pattern, the SYNC pattern is subdivided into a horizontal pattern (H pattern) and a vertical pattern (V pattern). In order to identify the pattern correctly, the correlation of a suitable mask in the form of the SYNC pattern is compared with that part 6 of the pattern 1 which is located within the field of view 9 of the optical signal recording device. The image shows correct identification of the pattern, in which a maximum number of hits comprising six matches for the H pattern and seven matches for the V pattern were found, that is to say a total of 13 matches. On the assumption of one bit error being permissible, the number of matches is defined to be N-1, where N denotes the number of matches found.

Figure 5:
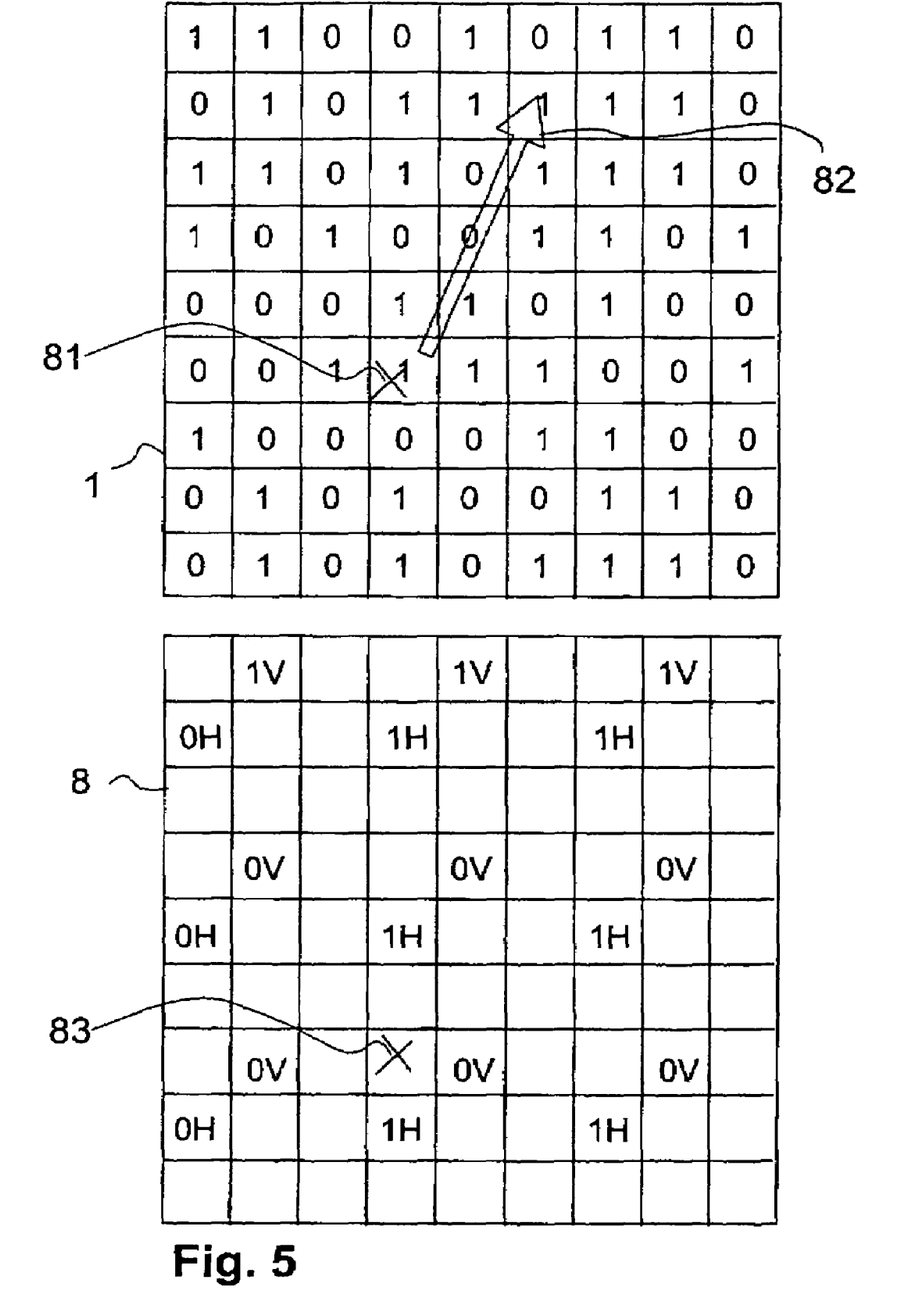
FIG. 5 shows an illustration of the cross-correlation test for SYNC pattern identification.

The determination of the position of the SYNC pattern by means of the best match between the surface pattern and the mask is preferably carried out by means of a cross-correlation test, as can be seen from the mask shown in FIG. 5. The mask 8 shows a SYNC pattern in which the horizontal and vertical components alternate in every alternate column. The entries in the mask have the bit value 0 or 1, followed by the designation H or V for the horizontal or vertical SYNC component, respectively. If the code unit has a size of 6×6 bits, this thus results in $(2\times6)^2=144$ different options for comparing the mask with the surface pattern. The position of the origin 83 of the mask is stated by means of a displacement vector 82, which points from an origin 81 to a module which, in this example with a 6×6 code unit, is less than 12 units away from the origin in the X direction and Y direction. That module which is located closest to the center of the field of view may be used, by way of example, as the origin.

If, furthermore, the azimuth orientation of the reading appliance with respect to the base is not known, for example if the reading appliance is a writing pen with reading optics which can be rotated freely in the hand, then four different azimuth orientation areas are also possible in addition to the 144 adjustment options, and these are each rotated through 90 with respect to one another. The number of possible positions on the SYNC pattern thus increases to 4×144=576 options. The number of matches and the discrepancies between the bit pattern of the mask 8 and the bit pattern of the surface pattern 1 are counted for each of the possible mask positions, and the result is stored in a list. Subsequently, the probability that the correct SYNC pattern has been found is determined for each of the results. The probability W that a specific position of the mask reflects the position of the SYNC pattern is in this case $W=Z1/(Z1+Z2)$, where Z1 is the number of matches and Z2 is the number of discrepancies.

Figure 6:
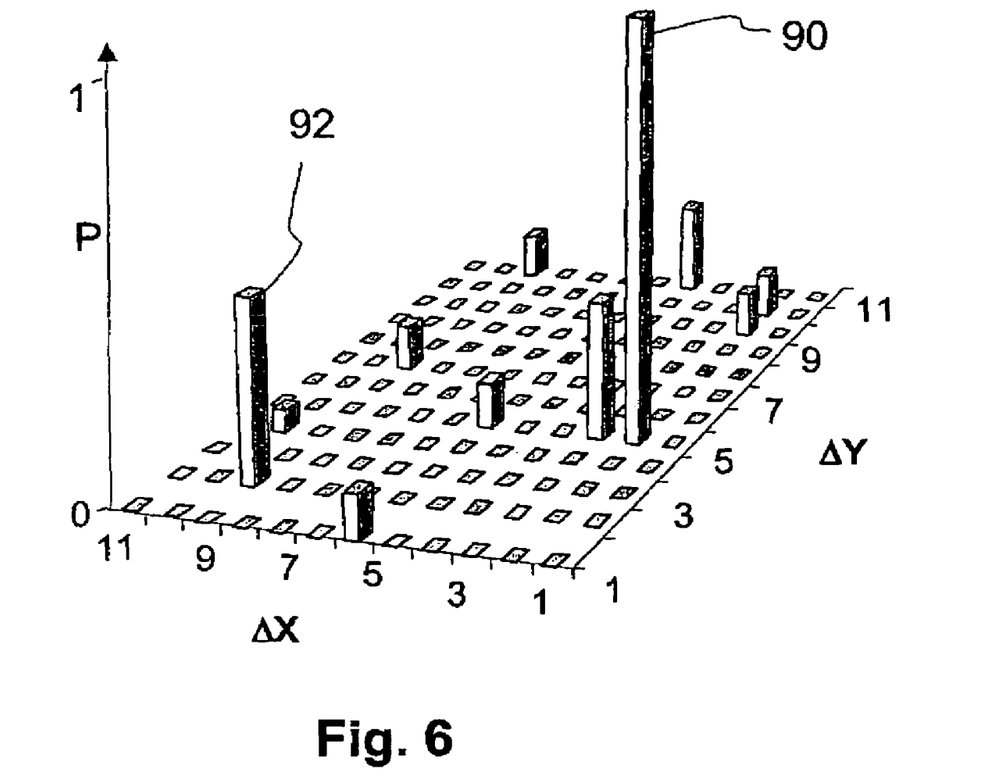
FIG. 6 shows an illustration of a result of a cross-correlation test.

FIG. 6 shows one possible result of such a context analysis in the form of a bar chart for one of four possible orientations. The probability P for the correct position of the displacement vector is shown in FIG. 6 as a function of the components $\Delta X$ and $\Delta Y$. The highest probability 90 is in this example obtained for a displacement vector $(\Delta X, \Delta Y)=(2,5)$. In some circumstances, it is worthwhile for the definition of the position of the SYNC pattern to output a number of probable options from the list. By way of example, the most probable result 90 and the second most probable result 92 may be output.

Figure 7:
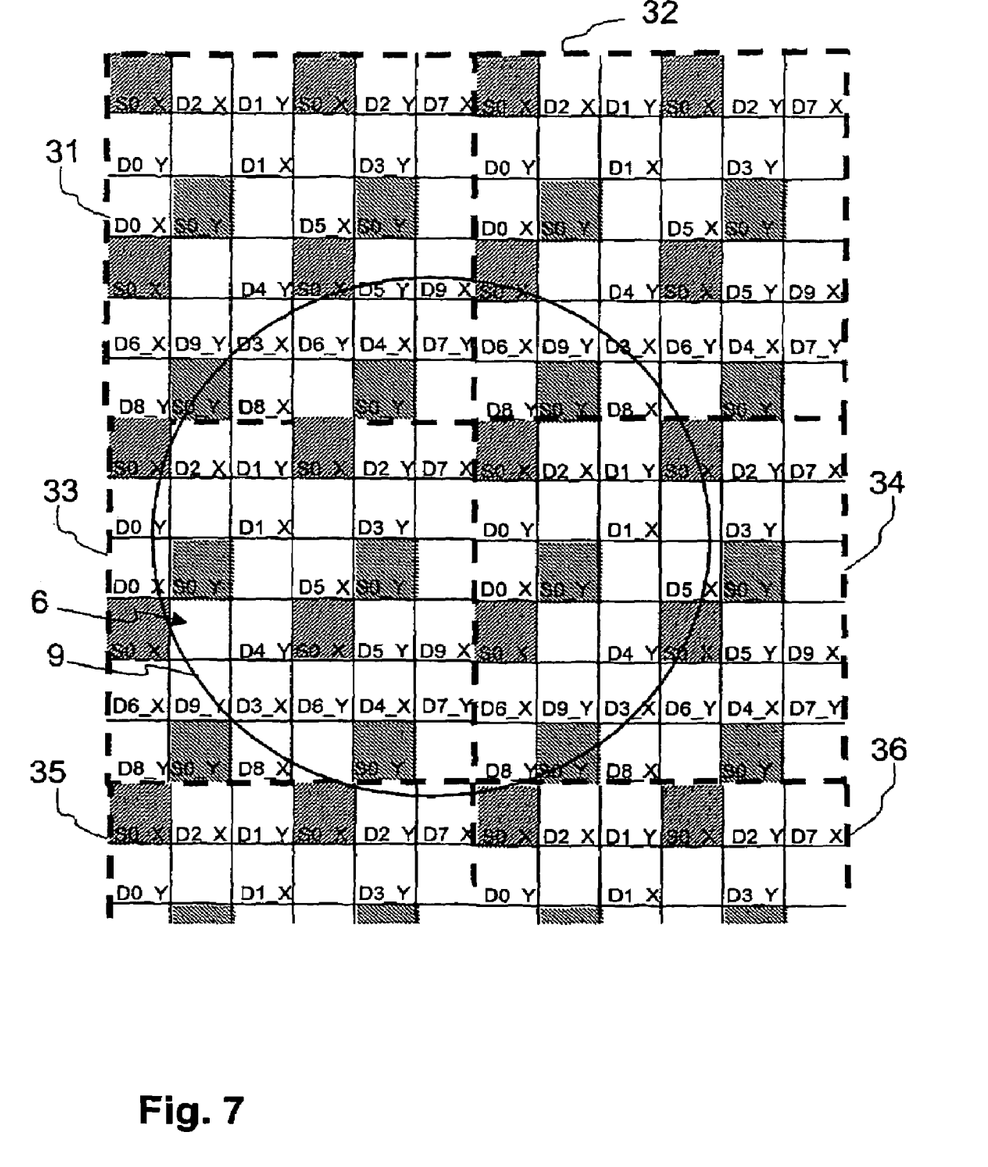
FIG. 7 shows, schematically, a decoding method on the basis of a detail of the surface pattern.

FIG. 7 shows a detail of a surface pattern 1 according to the invention with six code units 31 to 36, as well as an area 6 that is covered by the field of view 9 of reading optics. The code units 31 to 36 are in this example formed in the same way as the code unit 3 shown in FIG. 3. The boundaries between the code units are emphasized, as dashed lines.

The area 6, or the field of view, is so small that none of the code units is located completely within the area 6 in the position chosen by way of example. From the code unit 33 and compared with the adjacent code units, most of the modules or bits are located within the area 6. Modules or bits, at least half of whose area is still located within the area 6, may be used for evaluation. Accordingly, in order to determine the position of the code unit 33, the bits D0 Y, D0 X, D6 X, D8 Y, D8 X and D9 Y are located outside the area 6 and are thus not detected by the reading optics or by the evaluation algorithm. However, the missing bits for complete position determination can be obtained from the adjacent code units 31, 32 and 34. In particular, D0 Y, D0 X, D6 X and D8 Y can be determined from the code unit 34, D9 Y from the code unit 32 and D8 X from the code unit 31. The bit values need not in this case match the corresponding bit values of the adjacent code units. Since the formation rule that is used for coding the pattern is known, the missing bit values may be added by comparing the bit values of the neighbors with the formation rule.

Figure 8:
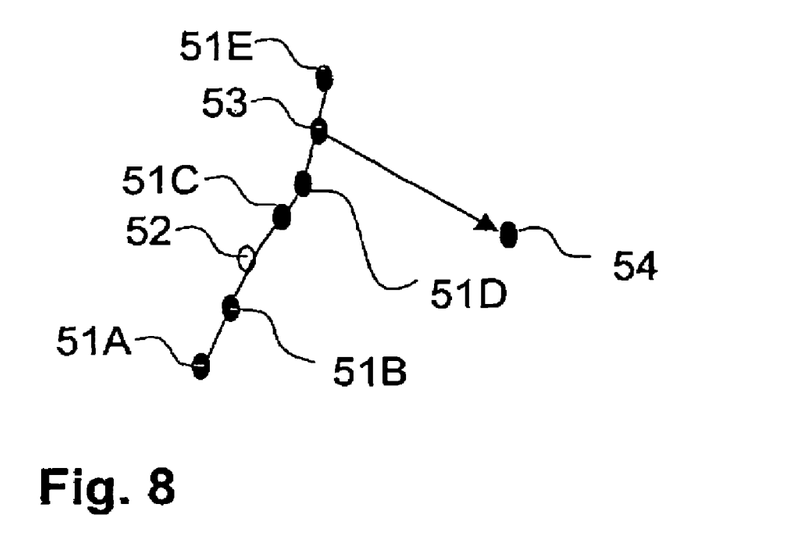
FIG. 8 shows an illustration of the postprocessing method for reading errors.

FIG. 8 shows an illustration of the context analysis, or of the post-processing method, for a position-dependent code which has been identified erroneously or incompletely. The reading appliance identifies the surface positions 51A to 51E by identifying the position-dependent code while scanning the surface. Reading errors, such as those that occur when the surface has spots that cover parts of the position-dependent code or make it unidentifiable may result in it not being possible to identify the code for a surface position 52. In particular, such a "no read" occurs when it has not been possible to find any SYNC pattern. In this situation, the data from the surrounding, correctly identified surface positions is used in order to reconstruct that position on the surface pattern that has not been identified. The reconstruction of the position 52 that has not been identified is based on interpolation of the position from the position data for the correctly identified surface positions 51B and 51C recorded nearest in time to the position 52. If it must still be possible to identify parts of the code within the field of view 9 relating to the position 52, then these parts can be compared with the interpolated position, with the exact position of the point or of the position 52 nevertheless still being determined, if required, from the code part and from the approximate position as determined by interpolation. Various code hypotheses are thus formed in the context analysis process from the area covered by the reading optics by addition to or modification of the pattern, with the most probable code for the code unit to be de-scrambled then being determined by comparing the various code hypotheses with decoded information relating to code units that are adjacent in time and/or spatially. The most probable code hypothesis is then chosen.

Reading errors can likewise occur in which an actual position 53 of the reading appliance is associated with a supposed position 54. This is the situation, for example, when one bit of the position-dependent code is incorrectly identified, so that the position 54 is offset in the x direction or y direction with respect to the actual position 53, or when an incorrect or ambiguous SYNC pattern is used as the basis. In this situation, the position 54 is identified as being improbable with respect to its positions 51D and 51E recorded most closely in time.

Figure 10:
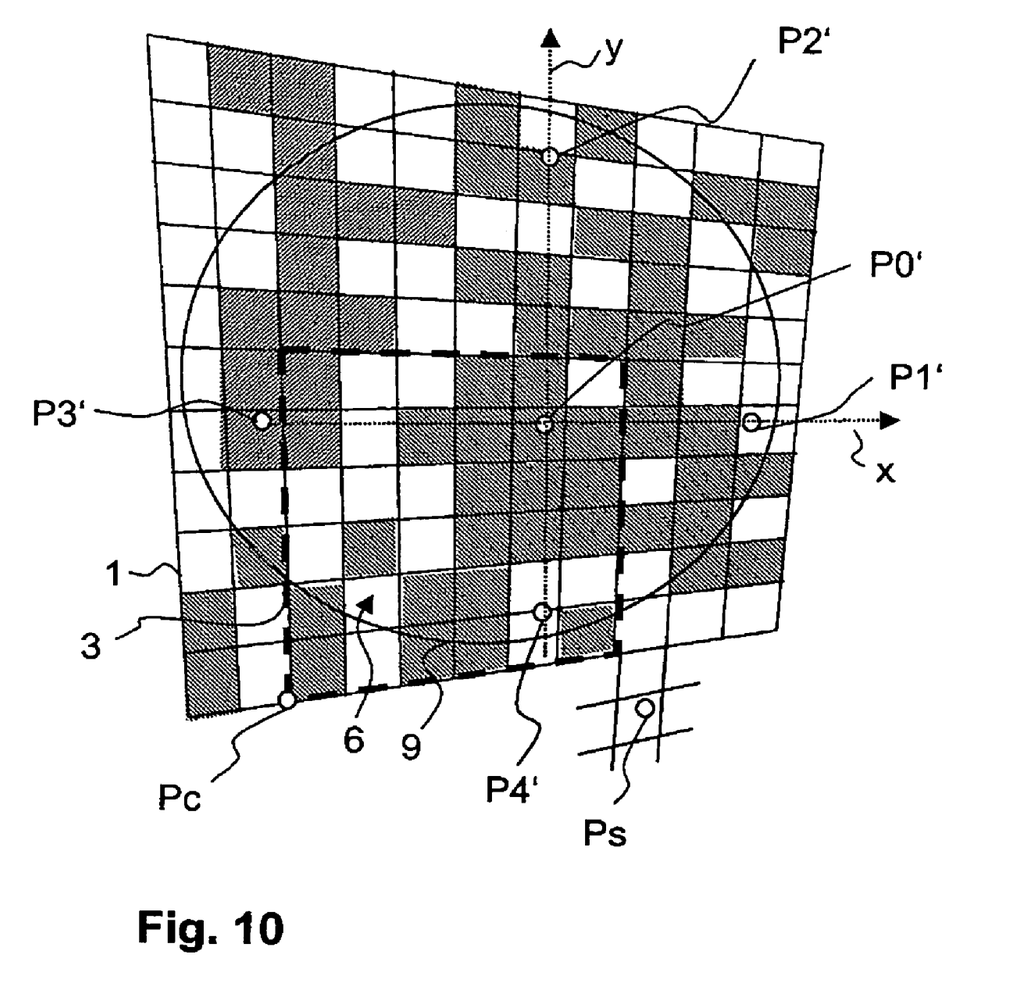
FIG. 10 shows a surface pattern with parallax distortion.

The identification of the grid on which the pattern is based and the determination of the position of the pen tip when the reading appliance is positioned obliquely relative to the normal direction to the surface will be described in the following text. FIG. 10 shows a detail of a surface pattern 1 with parallax distortion, and with an area 6 that is defined by the field of view 9 of the reading optics. The parallax distortion is the result of the reading optics being tilted with respect to the object plane. In the general case, a square in the object plane is imaged as a general quadrilateral.

The optimum grid is calculated from a large number of support points from the image shown in FIG. 6. The measurement accuracy (offset noise) of the grid is thus considerably better than would be expected from the signal-to-noise ratio of the system.

The parallax distortion of the optimum grid, which is significant in this application, results from a continuous frequency change of the grid constant by approximately ±20%, in both directions. The parallax distortion is in this case produced by the angular position of the pen, or of the reading appliance. The optimization problem for the grid is thus a function of five variables. Three of these denote degrees of freedom by rotation of the pen, while two others are linear movement degrees of freedom. If the field of view is very large, it may also be necessary to take into account the distortion of the objective.

The search for the optimum grid starts with band pass filtering of the image in the vicinity of the sampling frequency. The local signal power is then estimated, and an algorithm for statistical direction identification is then used.

The algorithms for searching for the optimum grid can in principle be matched to any desired module shapes, but the best stability is achieved with a checkerboard-like pattern.

The period, or the module size associated with it, is then determined for decoding. After this, the phase of the pattern is determined, and the optimum grid is constructed with optimally matched straight lines.

Figure 9A:
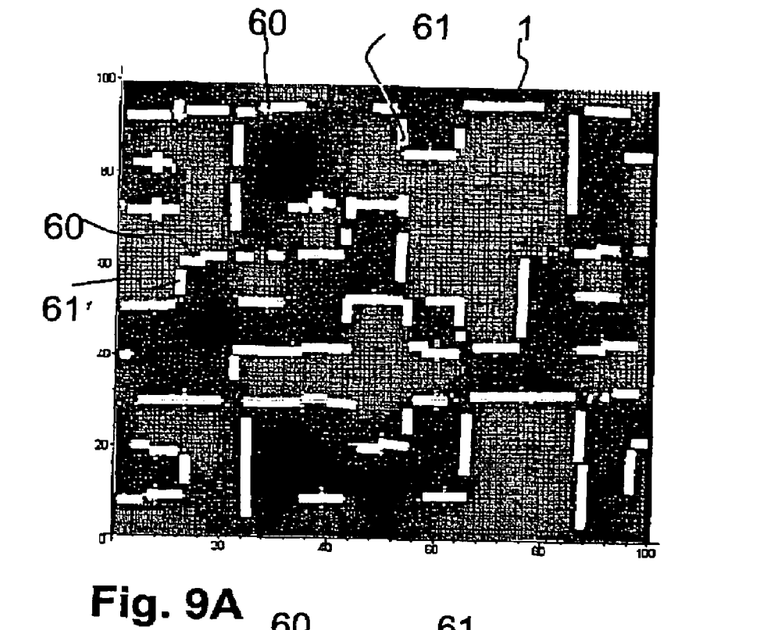
FIG. 9A shows a photograph of a detail of the surface pattern with 100×100 pixels.
Figure 9B:
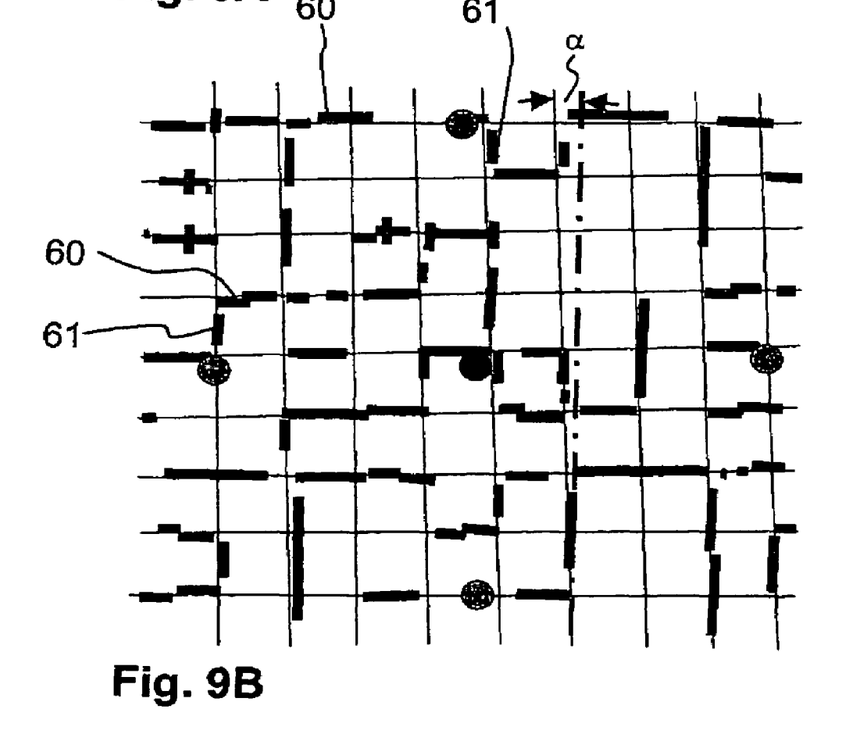
FIG. 9B shows contour segments extracted from a photograph of a detail of the surface pattern.

FIGS. 9A and 9B show a grid identification method that in particular is advantageous in terms of computation time. FIG. 9A shows a photograph of a detail of the surface pattern 1 with 100×100 pixels. Contour segments 60 are first of all calculated in one direction. This process is then carried out in a direction at right angles to this, thus resulting in contour segments 61 at right angles to the contour segments 60.

FIG. 9B shows the contour segments 60 and 61 extracted from the image of the surface pattern. The contour segments 60 and 61 are interpolated in two dimensions to form digital paths, thus resulting in a grid, or optimum grid, which is optimally matched to the image of the surface pattern.

The grid constructed in this way can then be used to find the optimum scanning or sampling points at the centers of the grid units, and to scan or sample the gray-scale image. The scanning or sample values are then quantized and digitized, thus resulting in a bit matrix. The position of the centers of the modules is in this case deduced from the totality of the available measurements before the quantization process.

After the quantization process, the SYNC pattern can then be identified and the quantized data can be decoded, as described above.

Furthermore, the position Ps of the pen tip, which located outside the field of view 9 in the example shown in FIG. 10, can be approximated from the position of the optimum grid and from the parallax distortion. Once the code unit has been decoded, the position of the pen tip is interpolated. A minimum of three support points located on the outside of the optimum grid are used for this purpose, although more than three would give a better result. By way of example, FIG. 10 shows four support points P1', P2', P3' and P4'. The central projection of the objective allows the position of the n pixels which are chosen as support points and whose distance from the optical axis is known to be transferred into n projection straight lines with a known gradient. This allows an equation system to be formulated, which produces those intersections of the optical axis with the plane of the paper that result in the least mean square error for the distances between them in the object plane. These distances are known from the grid constant and from the position of the optimum grid.

Since the optimum grid can be calculated considerably more accurately than the distance between the code modules—as mentioned above an approximation error of better than 0.1 mm can be achieved with a code module size of 0.4 mm and good contrast—the position of the intersection of the optical axis with the paper can likewise be determined with a resolution of better than 0.1 mm. The desired intersection is obtained from the position of the plane and from the known linear equation from Mine with a good resolution, of better than 200 dpi.

Figure 11:
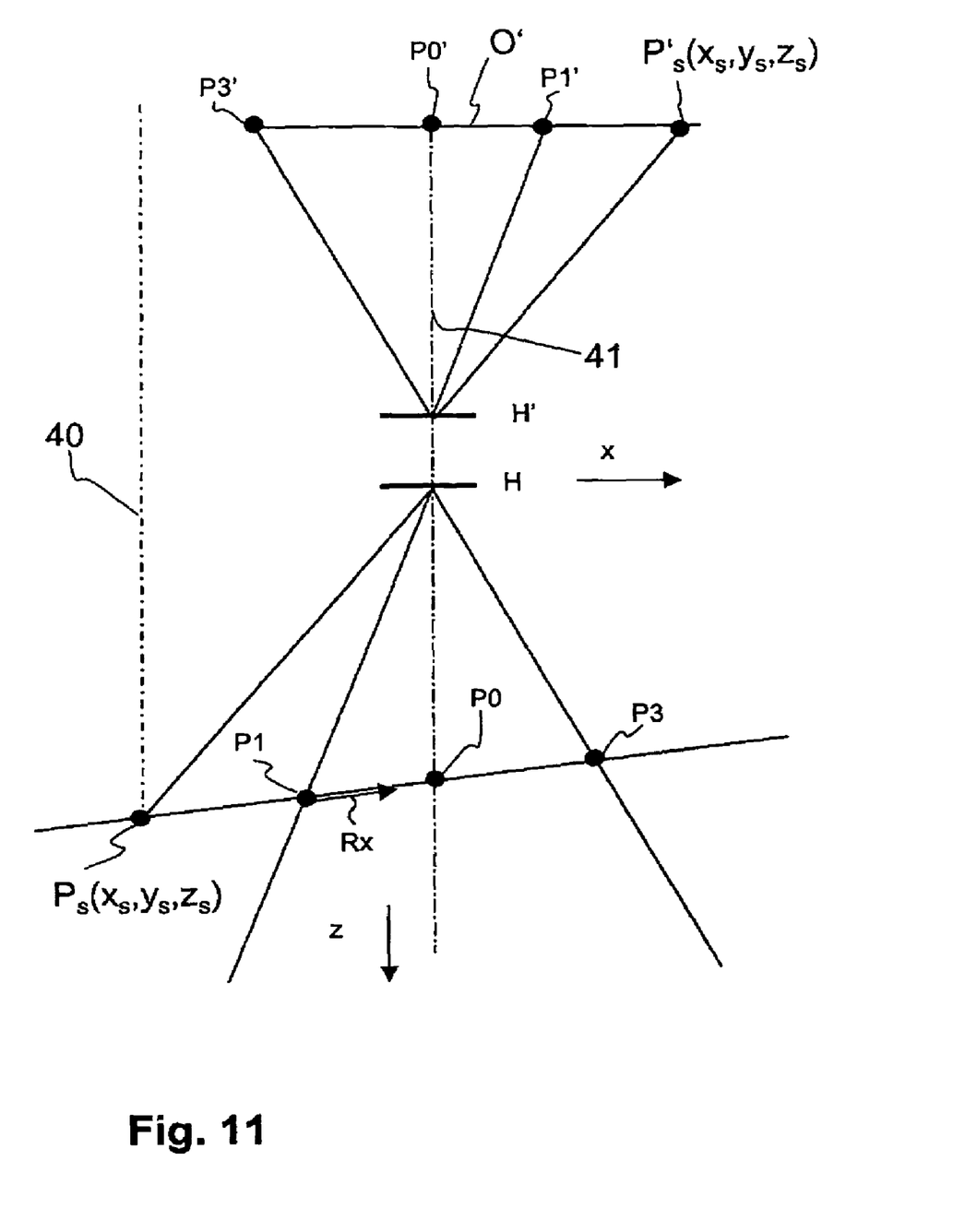
FIG. 11 shows the beam path through the reading optics along a plane at right angles to the image plane.

The method will be described in more detail in the following text with reference to FIG. 11, which illustrates the beam path through the reading optics. The distances between the grid points in the optimum grid on the object are known, and correspond to the module (for example approximately 4 mm). The actual position of the object plane with respect to the main plane of the objective can be reconstructed by back-projection of at least three beams through the principal point of the objective. To do this, a plane is first of all placed through the points P0', P1' and P3'. P0' denotes the intersection of the optical axis with the image plane. The points P1' and P3' are likewise located on the image plane, with the line between P1' and P3' being parallel to one direction of the grid, and that between P2' and P4' being parallel to the other direction of the grid. The particular position of these points P1' ... P4 on grid lines ensures that because the distances between the corresponding points P1 to P4 on the object plane, that is to say on the writing paper, are known.

The gradient m3 of the line from H' to P3', and the gradient m1 of the line from H' to P1' relative to the optical axis, can be determined from the position of the principal planes of the optics, H and H', and from the distances P3'P0' and P1'P0'. The distances from P3' to P0' and from P1' to P0' may differ owing to the parallax distortion.

The gradient of the direction vector Rx in the object plane is given by the following relationship:

$$m_{Rx} := \frac{m3 + m1 k13}{1 + k13}.$$

In this case, the factor k13 is given by the ratio of the length: k13=P1P0/P3P0.

A corresponding situation applies to the direction vector Ry in the direction at right angles to this:

$$m_{Ry} := \frac{m4 + k24 m2}{1 + k24}.$$

In this case, m4 denotes the gradient of the line from H' to P4', m2 denotes the gradient of the line from H' to P2' and k24 denotes the ratio of the distances of k24=P2P0/P4P0.

The vectors Rx and Ry are then rotated through the angle α about the z axis. The angle α indicates the angle through which the optimum grid is rotated in the image plane.

Finally, the plane obtained in this way is shifted parallel along the optical axis until the point $P_s(x_s, y_s, z_s)$ of the pen tip (whose position relative to the image plane is known) lies on this plane. The position of the point $P'_s(x'_s, y'_s)$ on the image plane is likewise known from the projection of the point $P_s(x_s, y_s, z_s)$ onto the image plane.

The position of the pen tip is thus defined geometrically as a point in the plane equation. The position of the pen tip relative to the position of the point P0' can then be obtained by converting the Cartesian coordinates, as coordinates, into units of module lengths for the paper plane in the planar equation obtained in this way.

The absolute position of the point P0', and hence the absolute position of the pen tip, is, finally, obtained by decoding the surface pattern.

LIST OF REFERENCE SYMBOLS

| | |
|---|---|
| Surface pattern | 1 |
| SYNC pattern | 2 |
| Horizontal SYNC pattern | 21 |
| Vertical SYNC pattern | 22 |
| Code unit | 3, 31, 32, 33, 34, 35, 36 |
| Horizontal direction of the SYNC pattern | 4 |
| Pattern area detected by the field of view | 6 |
| Field of view | 9 |
| Shape elements | 11, 12 |
| Surface positions | 51A to 51E, 52 to 54 |
| Contour segments | 60, 61 |
| Mask | 8 |
| Origin of the pattern | 81 |
| Displacement vector | 82 |
| Origin of the mask | 83 |
| Probabilities of the positions of the displacement vector | 90, 92 |
| Axis of the writing appliance | 40 |
| Optical axis of the image recording device | 41 |
| Intersection of the optical axis with the image plane | P0' |
| Support points | P1', P2', P3', P4' |
| Position of the writing tip | Ps |

We claim:

1. A two-dimensional surface pattern, in particular for identifying an absolute position on the surface, comprising a pattern (1), the pattern (1) containing a SYNC pattern (2), which is used for synchronization, and a position-dependent code PC(x, y), wherein the SYNC pattern (2) is variable and is formed in accordance with an already known formation rule, with the SYNC pattern (2) comprising the least significant bit of the position-dependent code PC(x, y), and whereby a code unit of said pattern consists of 6×6 bits.

2. The two-dimensional surface pattern as claimed in claim 1, wherein the SYNC pattern (2) comprises two variable components (21, 22), which are each used for synchronization along two directions, which are not parallel, on the surface.

3. The two-dimensional surface pattern as claimed in claim 1, wherein the SYNC pattern (2) is distributed geometrically uniformly over the surface.

4. The two-dimensional surface pattern as claimed in claim 1, wherein the SYNC pattern (2) has a position-dependent code.

5. The two-dimensional surface pattern as claimed in claim 1, wherein components of the pattern are combined in one unit of the code, which code unit (3, 31, 32, 33, 34, 35, 36), preferably comprises a square or hexagonal shape.

6. The two-dimensional surface pattern as claimed in claim 1, wherein the SYNC pattern (2) occurs at at least twice a position frequency in the x and y directions in comparison to the position-dependent code of the position-dependent code PC(x, y).

7. The two-dimensional surface pattern as claimed in claim 1, wherein the surface pattern comprises a document identifier DI.

8. The two-dimensional surface pattern as claimed in claim 1, wherein the SYNC pattern (2) comprises parts of the document identifier.

9. The two-dimensional surface pattern as claimed in claim 1, wherein at least one of the position-dependent code PC(x, y) and document identifier, DI, is redundantly coded.

10. The two-dimensional surface pattern as claimed in claim 1, wherein a function which describes neighborhood relationships to other adjacent code units (3, 31, 32, 33, 34, 35, 36) is associated with the position-dependent code PC(x, y).

11. The two-dimensional surface pattern as claimed in claim 10, wherein others of the position-dependent codes PC(x, y) are calculatable from the position-dependent code PC(x, y) of a known code unit (3, 31, 32, 33, 34, 35, 36) by means of the function which is associated with the position-dependent code PC(x, y).

12. The two-dimensional surface pattern as claimed in claim 10, wherein the position-dependent code PC(x, y) of all adjacent code units (3, 31, 32, 33, 34, 35, 36) are calculatable from a single position-dependent code PC(x, y) by means of the function which is associated with the position-dependent code PC(x, y).

13. The two-dimensional surface pattern as claimed in claim 1, wherein a sequence of the code units (3, 31, 32, 33, 34, 35, 36) on the surface is scrambled in any desired direction on the surface.

14. The two-dimensional surface pattern as claimed in claim 1, wherein a size of a code unit (3, 31, 32, 33, 34, 35, 36) in one direction on the surface is 4 mm.

15. The two-dimensional surface pattern as claimed in claim 1, wherein the pattern has a modulation.

16. The two-dimensional surface pattern as claimed in claim 15, wherein the modulation comprises amplitude modulation which, in particular, has a light/dark pattern of shape elements (11, 12).

17. The two-dimensional surface pattern as claimed in claim 16, wherein the shape elements (11, 12) comprise squares, triangles, circles or dots.

18. The two-dimensional surface pattern as claimed in claim 15, wherein the modulation comprises phase modulation, PSK, in which shape elements (11, 12), in particular dots, are arranged shifted with respect to a reference grid.

19. The two-dimensional surface pattern as claimed in claim 15, wherein the modulation comprises frequency modulation, FSK, in which groups of shape elements (11, 12) are arranged at predefined 2D position frequencies on the surface.

20. The two-dimensional surface pattern as claimed in claim 1, wherein the pattern has more than one color, in particular more than one spectrally separable component, and one spectrally separable component has a different modulation than another spectrally separable component.

21. The two-dimensional surface pattern as claimed in claim 20, wherein the spectrally separable components cover the IR spectrum and, in particular, IR/fluorescence bands of colors which are excitable and are printable on the surface.

22. The two-dimensional surface pattern as claimed in claim 1, wherein the surface pattern (1) is printed on an adhesive strip.

23. The two-dimensional surface pattern as claimed in claim 1, wherein the surface pattern (1) is subdivided into a number of parts.

24. The two-dimensional surface pattern as claimed in claim 23, wherein the parts are located separately from one another on at least one surface.

25. The method for decoding data which is contained in a surface pattern as claimed in claim 1, with the surface pattern containing a variable SYNC pattern (2), which is used for synchronization and is formed in accordance with an already known formation rule, as well as a position-dependent code PC(x, y), with the SYNC pattern (2) comprising the least significant bit of the position-dependent code PC(x, y), and whereby a code unit consists of 6×6 bits, wherein the result of the decoding process for each code unit (3, 31, 32, 33, 34, 35, 36) leads to a number of vectors vij of the type: the position-dependent code PC(x, y), document identifier, time stamp, error number, position of the pen tip, with the time stamp describing the time at which a code unit was detected, the error number describing the number of errors during detection of the code, and the position of the pen tip describing the point of a writing appliance on the surface.

26. The method for decoding data which is contained in a surface pattern as claimed in claim 25, wherein a number of vectors vij are combined to form a script segment when a condition, in particular the condition "pen writing", is satisfied.

27. The method for decoding data which is contained in a surface pattern as claimed in claim 26, wherein the script segment is filtered by a position filter.

28. The method for decoding data which is contained in a surface pattern as claimed in claim 26, furthermore distinguished by the use of a Reed Solomon or Hamming code for error correction.

29. The method as claimed in claim 28, wherein two errors per coordinate can be identified, and one error per coordinate can be corrected, using the Hamming code or Reed Solomon code.

30. The method for decoding data which is contained in a surface pattern as claimed in claim 25, wherein the data in the document identifier is extracted from different parts of an 8.times.8 bit surface information item which is contained in the pattern.

31. The method for decoding data which is contained in a surface pattern as claimed in claim 25, in which the vectors vij are combined in a time sequence, corresponding to the data which is detected by a pen by means of an optical detection device.

32. The method for decoding data which is contained in a surface pattern as claimed in claim 25, wherein, when the "pen writing" condition is satisfied during the decoding process, only movements by .+−. one code unit are allowed in one of the directions on the surface.

33. The method for decoding data which is contained in a surface pattern as claimed in claim 25, wherein the script segment is filtered by means of a filter in which, when one code unit produces differences which are greater than unity, the vector is then excluded and its position-dependent code PC(x, y) is replaced by interpolation of its neighbors in time.

34. The method for decoding data which is contained in a surface pattern as claimed in claim 25, further distinguished by an error correction method.

35. The method for decoding data which is contained in a surface pattern as claimed in claim 25, distinguished by context analysis, with the most probable code for the questionable code unit to be descrambled being determined by comparing different code hypotheses with decoded information in time and/or physically adjacent code units.

36. The method for decoding data which is contained in a surface pattern as claimed in claim 25, wherein the surface pattern is sampled or scanned at more than 100 Hz, preferably at more than 200 Hz, and most preferably at at least 300 Hz.

37. The method for decoding data which is contained in a surface pattern as claimed in claim 25, wherein the speed on the surface up to which the absolute position within the two-dimensional pattern can be identified is approximately 1.2 m/s at a sampling or scanning rate of approximately 300 Hz.

38. The method for decoding data which is contained in a surface pattern as claimed in claim 25, wherein the data in the document identifier is obtained from more than one code unit.

39. The method for decoding data which is contained in a surface pattern as claimed in claim 38, wherein a multiple identification process is carried out for the data in the document identifier.

40. A method for decoding data in an area of a surface pattern, with the surface pattern containing a variable SYNC pattern (2), which is used for synchronization and is formed in accordance with an already known formation rule, as well as a position-dependent code PC(x, y), with the SYNC pattern (2) comprising the least significant bit of the position-dependent code PC(x, y), and whereby a code unit consists of 6×6 bits, wherein a complete position-dependent code which is associated with one position on the surface pattern can always be decoded from the area (6) of the surface pattern (1), in that parts of adjacent position-dependent codes which are located in that area of the surface pattern are used to supplement missing parts of the position-dependent code for decoding.

41. The method as claimed in claim 40, wherein the area (6) of the surface pattern is so small that at most one position-dependent code which is associated with one position on the surface pattern may be present completely within the area (6).

42. The method for decoding as claimed in claim 40, wherein the area (6) of the surface pattern has any desired shape.

43. The method as claimed in claim 40, wherein components of the pattern are combined in one unit of the code, a code unit (3, 31, 32, 33, 34, 35, 36) and the area (6) is so small that at most one code unit (3, 31, 32, 33, 34, 35, 36) is located completely in the area.

44. A method for determining the position (Ps) of a tip of a writing appliance with an optical image recording device on a surface by decoding data which is contained in a surface pattern as claimed in claim 1, with the surface pattern containing a variable SYNC pattern (2), which is used for synchronization and is formed in accordance with an already known formation rule, as well as a position-dependent code PC(x, y), with the SYNC pattern (2) comprising the least significant bit of the position-dependent code PC(x, y), and whereby a code unit consists of 6×6 bits, wherein the grid on which the pattern (1) is based is compared with the image recorded by the writing appliance and any parallax distortion is determined, wherein the angle of tilt of a defined axis (40) of the writing appliance relative to the surface is calculated from the parallax distortion, and a displacement vector relative to an axis (41) of the image recording device is calculated from the tilt.

45. The method for determining the position (Ps) of a tip of a writing appliance as claimed in claim 44, wherein the defined axis (40) of the writing appliance runs through the pen tip of the writing appliance and essentially in the direction of its longest extent.

46. The method for determining the position (Ps) of a tip of a writing appliance as claimed in claim 44, wherein the axis (41) of the image recording device is the optical axis of the imaging system of the image recording device.

47. The method for determining the position of a tip of a writing appliance as claimed in claim 44, wherein the position (Ps) of the pen tip is determined from the intersection of the optical axis (41) of the image recording device with the surface, and addition of the displacement vector to this intersection.

\* \* \* \* \*